United States Patent
Friggstad

(10) Patent No.: US 8,235,133 B2
(45) Date of Patent: Aug. 7, 2012

(54) AGRICULTURAL IMPLEMENT HAVING WHEELS THAT CASTER

(75) Inventor: Terrance A. Friggstad, Grasswood (CA)

(73) Assignee: CNH Canada, Ltd. (CA)

(*) Notice: Subject to any disclaimer, the term of this patent is extended or adjusted under 35 U.S.C. 154(b) by 268 days.

(21) Appl. No.: 12/258,097

(22) Filed: Oct. 24, 2008

(65) Prior Publication Data

US 2010/0101812 A1    Apr. 29, 2010

(51) Int. Cl.
 *A01B 63/16* (2006.01)
(52) U.S. Cl. .................. 172/386; 172/311; 16/35 R
(58) Field of Classification Search .............. 172/311, 172/383, 384, 386; 16/35 R, 35 D, 18 R
See application file for complete search history.

(56) References Cited

U.S. PATENT DOCUMENTS

| | | | |
|---|---|---|---|
| 1,288,773 A * | 12/1918 | Waterman | 172/410 |
| 1,316,696 A * | 9/1919 | Dickinson | 172/386 |
| 1,489,467 A * | 4/1924 | Strandlund | 172/386 |
| 1,598,803 A * | 9/1926 | Brown et al. | 172/386 |
| 2,353,659 A * | 7/1944 | Frank | 172/386 |
| 2,490,656 A * | 12/1949 | Seaholm et al. | 172/386 |
| 2,660,940 A * | 12/1953 | Baughman | 172/386 |
| 2,669,920 A * | 2/1954 | Da Valle | 172/400 |
| 2,682,822 A * | 7/1954 | Toland et al. | 172/386 |
| 4,119,156 A * | 10/1978 | Wheeler et al. | 172/386 |
| 4,138,134 A | 2/1979 | Lechler et al. | |
| 4,253,528 A * | 3/1981 | Sullivan et al. | 172/386 |
| 4,359,105 A * | 11/1982 | Van Natta | 172/386 |
| 4,496,004 A * | 1/1985 | Frase et al. | 172/311 |
| 4,504,076 A | 3/1985 | Bedney | |
| 4,883,127 A * | 11/1989 | Chevrier | 172/126 |
| 4,893,682 A | 1/1990 | Smallacombe | |
| 4,944,355 A | 7/1990 | Karchewski | |
| 6,076,613 A | 6/2000 | Frasier | |
| 6,293,352 B1 | 9/2001 | Hundeby et al. | |
| 6,336,511 B1 * | 1/2002 | Friggstad | 172/311 |
| 6,550,543 B1 * | 4/2003 | Friggstad | 172/311 |
| 6,758,284 B2 | 7/2004 | Myers | |
| 6,860,335 B2 | 3/2005 | Arnett | |
| 7,347,277 B2 | 3/2008 | Enns et al. | |
| 2007/0240889 A1 | 10/2007 | Neudorf et al. | |

* cited by examiner

*Primary Examiner* — Thomas B Will
*Assistant Examiner* — Joel F. Mitchell
(74) *Attorney, Agent, or Firm* — Rebecca Henkel; Sue Watson

(57) ABSTRACT

An agricultural implement includes a hitch boom to which a pair of wing booms is pivotably connected. The wing booms are designed to fold forward from an extended position to a transport position. The wing booms are supported above a surface by wheels that provide the aforementioned support when the wing booms are in an extended position as well as the transport position. Maintaining surface contact of the wheels in both positions reduces the load placed on the hitch to which the hitch boom is coupled as well as the hitch boom itself. Multi-link draft links are connected between the hitch boom and the wing booms to provide support for the wing booms when the wing booms are in the extended position. The relative length of the draft links dictates how far the hitch telescopes when the wing booms are folded to the stowed or transport position.

9 Claims, 13 Drawing Sheets

AGRICULTURAL IMPLEMENT HAVING WHEELS THAT CASTER

BACKGROUND OF THE INVENTION

The present invention relates generally to agricultural implements and, more particularly, to a forward folding planter having improved maneuverability and hitch loading when in a transport configuration.

Agricultural planters generally consist of a hitch boom to which a pair of wing booms are coupled. The wing booms support a series of spaced seed units that deposit seed, fertilizer or other granular material onto a planting surface, e.g., farm field. Because of the relatively large wingspan of the wing booms, the planter frame will also include a pair of draft links. The draft links extend between the hitch boom and the wing booms, and are designed to add stability to the wing booms as the planter traverses the planting surface. In some planters, the wing booms are designed to fold forward against the hitch boom. For such forward-folding planters, the wing booms will typically be folded forward when the planter is ready for transport. That is, a planter generally has a working position in which the wing booms are fully extended away from the hitch boom and a transport position in which the wing booms are folded forward. In the transport position, the width of the planter is greatly reduced which is advantageous for exiting the planting surface and for storage of the planter. Additionally, when being shipped, the planter will be placed in its transport position.

To expedite particulate matter deposition onto the planting surface, planter manufactures are adding length to the wing booms thereby allowing more seed units to be mounted along the length of the wing booms. As a result of the increases in length of the wing booms, the outer ends of the wing booms may undesirably extend past the hitch of the towing vehicle, e.g., tractor, when the planter is in the transport position. As such, large agricultural planters are typically used with telescoping rather than fixed length hitches. More particularly, the hitch boom is coupled to a telescoping hitch that is extended as the wing booms are folded forward. The telescoping hitch therefore provides clearance for the tractor when the outer ends of the wing booms come together.

When the wing booms have been folded forward and engaged with the telescoping hitch, the telescoping hitch is lifted to provide clearance for the wheels that support the wing booms above the planting surface. This lifting of the hitch loads the rear wheels supporting the hitch boom and the hitch itself with a majority of the weight of the planter, which can result in overloading. In addition, it can be difficult to turn the planter when it is being towed as the elongation of the hitch to accommodate the folded wing booms greatly adds to the length of tow, and thus, the area required for cornering the planter.

When the wing booms are folded forward, the draft links connected between the hitch boom and the wing booms cause the hitch boom to pull on the telescoping hitch to effectively extend the telescoping hitch to provide the aforementioned clearance for the wing booms. As such, the lengths of the draft links and their connection points to their respective wing booms dictate how far the telescoping hitch is extended. The farther out on the wing boom the connection point the more of the telescoping hitch that will be extended when the wing booms are folded forward. Therefore, the desired change in length, dictated by the amount of room required for the tractor to clear the wing booms when the booms are in the fully folded position, dictates the position the connection point of the draft links to the wing booms. However, the amount of length required to extend the hitch often results in a connection point that is structurally insufficient to support the draft links when the wing booms are in their working position. As such, it is generally necessary to use heavy hinges to connect the draft links to the wing booms and undesirably expose the wing booms to greater stress.

Therefore, there is a need for an agricultural planter having a forward folding frame that places less load on the frame itself and the hitch when in a transport configuration. There is also a need for an agricultural planter having improved maneuverability when being transported.

SUMMARY OF THE INVENTION

The present invention is directed to a forward folding agricultural planter particularly well suited for use with a telescoping hitch coupled to a towing vehicle, such as a tractor. The planter has a pair of wing booms pivotably coupled to a hitch boom and that fold forward to stow the wing booms in a transport position. Draft links are connected between the hitch boom and the wing booms to provide stability for the wing booms when the wing booms are in an extended, working position but also dictate how far the telescoping hitch is extended when the booms are folded forward.

The wing booms are supported by respective wheels assemblies having wheels that may be rotated downward as the wing booms are folded forward and then allowed to caster as the planter is towed. In this regard, the wheels support the wing booms when the wing booms are in the extended working position as well as the folded transport position. Thus, less load is placed on the hitch as well as the rear wheels that support the hitch boom when the planter is in the transport position.

The wing booms are coupled to the hitch boom by a mounting arrangement that allows the wing booms to rotate or pivot upward relative to the hitch boom when the wing booms are folded forward. Rotating the wing booms slightly upward provides clearance for the seed units that are carried by the wheel booms. To maintain engagement of the wheel assemblies with the planting surface as the wing booms are rotated upward, the wheel assemblies-rotate under the wing booms to elevate the wing booms to a tranposrt position and to allow the wheels to caster. Thus, as noted above, the wheels maintain continuous engagement with the planting surface as the wing booms are folded from the working position to the transport position.

The placement of the draft links is optimized so that the telescoped hitch is extended by a minimal amount necessary for the outer ends of the wing booms to clear the rear of the towing vehicle when the wing booms are in the fully folded position.

The draft links each include an inner link member and an outer link member connected to one another by a hinge that allows the link members to pivot. The inner link member is connected to the hitch boom and the outer link member is connected to the wing boom. An actuator such as a hydraulic cylinder is connected between the wing boom and the outer link and is designed to draw the outer link inward against the wing boom when the wing boom is being folded forward. As a result, the link members fold upon themselves as the wing booms are being folded forward to the transport position.

The hitch boom includes a wing boom retainer that loosely captures the outer ends of the wing booms when the wing booms are in the fully folded position. The retainer is constructed to retain the outer ends yet allow limited vertical and fore/aft movement, e.g., oscillation, of the wing booms as the planter is being transported.

Thus, it is one object of the invention to provide a forward folding planter that places less stress on the hitch of the towing vehicle when the planter is being towed in transport.

It is another object of the invention to provide a planter that is more maneuverable when in transport yet that does not impact the rigidity required during working, i.e., seeding or fertilizing.

It is yet a further object of the invention to provide a planter for use with a telescoping hitch that extends the hitch by a minimal amount necessary when the planter is folded forward to a transport position.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION OF THE INVENTION

Figure 1:
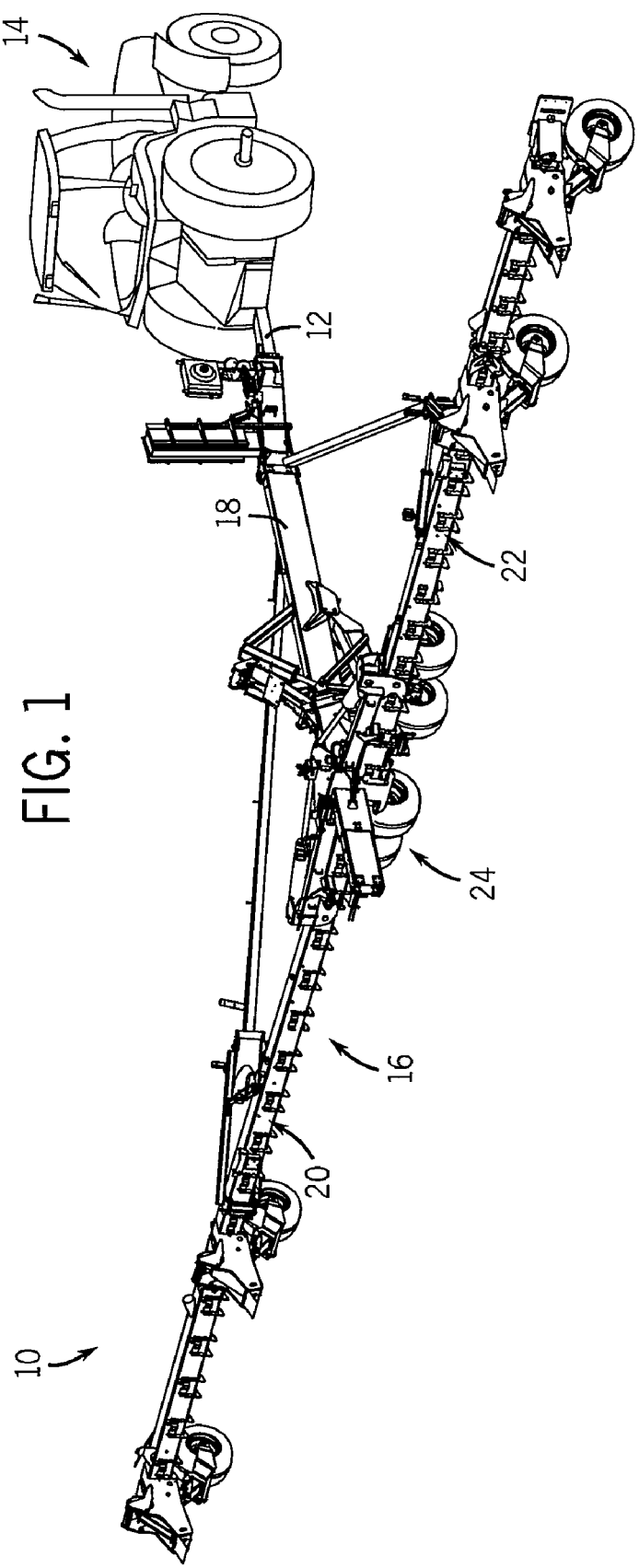
FIG. 1 is an isometric view of an agricultural planter hitched to a tractor.

The present invention is directed to an agricultural planter 10 particularly suited for use with a telescoping hitch 12 carried by or otherwise coupled to a tractor 14 or similar towing vehicle as shown in FIG. 1. The planter 10 includes a frame 16 generally comprised of a hitch boom 18 that connects to the telescoping hitch 12 and a pair of wing booms 20, 22 that are connected to the hitch boom 18. The wing booms 20, 22 are connected to the hitch boom 18 at a mount 24 in a manner that allows the wing booms 20, 22 to fold forward.

Although not pictured, seed units, seed/fertilizer hoppers, cabling, and hydraulics are mounted to the hitch boom 18 and the wing booms 20, 22 to control the deposition of seed, fertilizer, insecticide, herbicide, and the like onto the planting surface.

As will be appreciated by one skilled in the art, the hitch boom 18 is generally aligned with the hitch 12 and defines a central axis that generally runs parallel with the direction of travel of the tractor. In this regard, wing boom 20 constitutes a "left-side" wing boom and wing boom 22 constitutes a "right-side" wing boom. The wing booms 20, 22 are oriented symmetrically about the hitch boom 18 and are similarly constructed. As such, for purposes of description, the left-side wing boom 20 will be described but it is understood that the right-side wing boom 22 is of similar construction.

Figure 2:
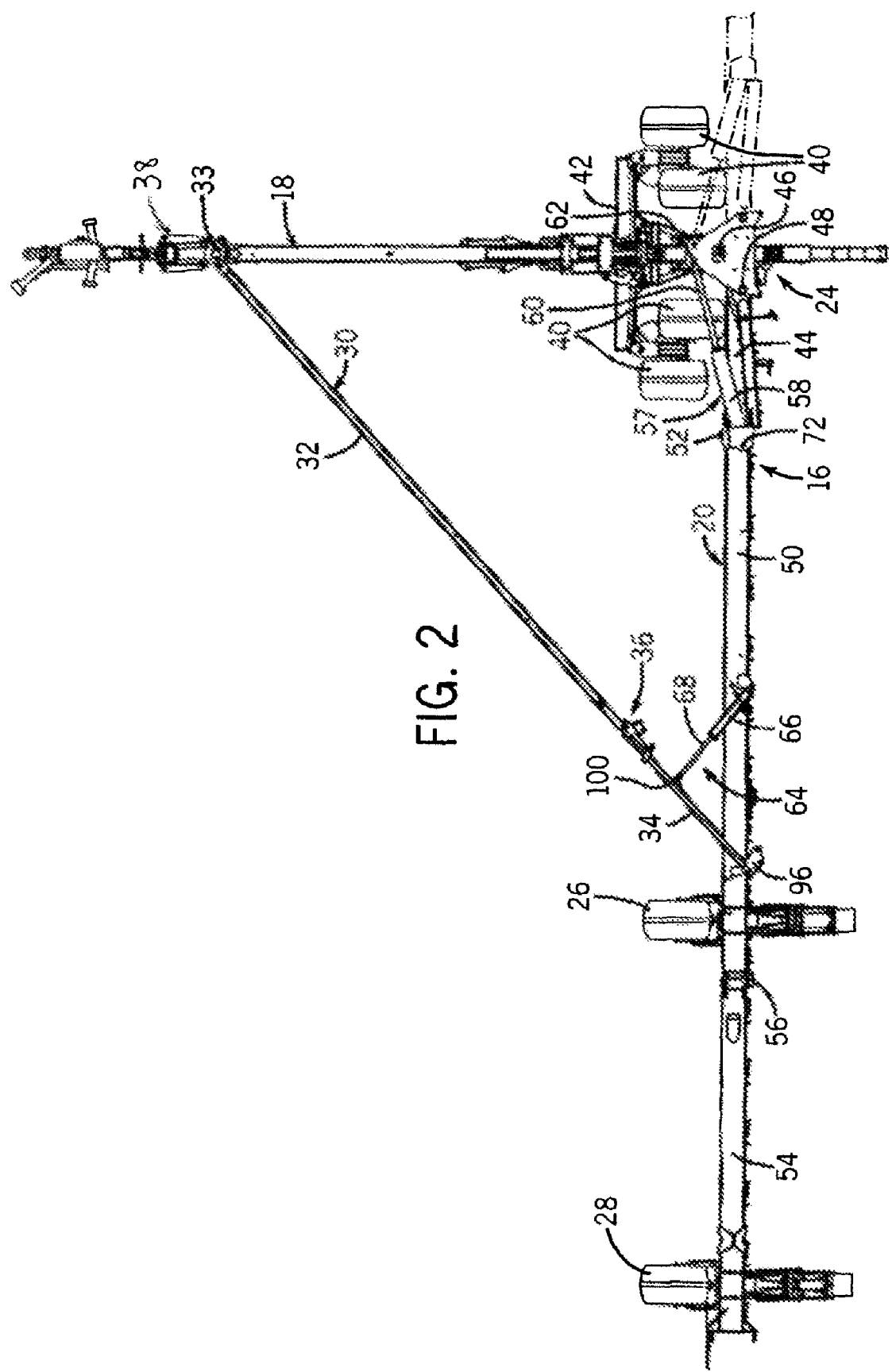
FIG. 2 is a partial top plan view of the planter of FIG. 1 showing a hitch boom and a wing boom in an extended position.
Figure 3:
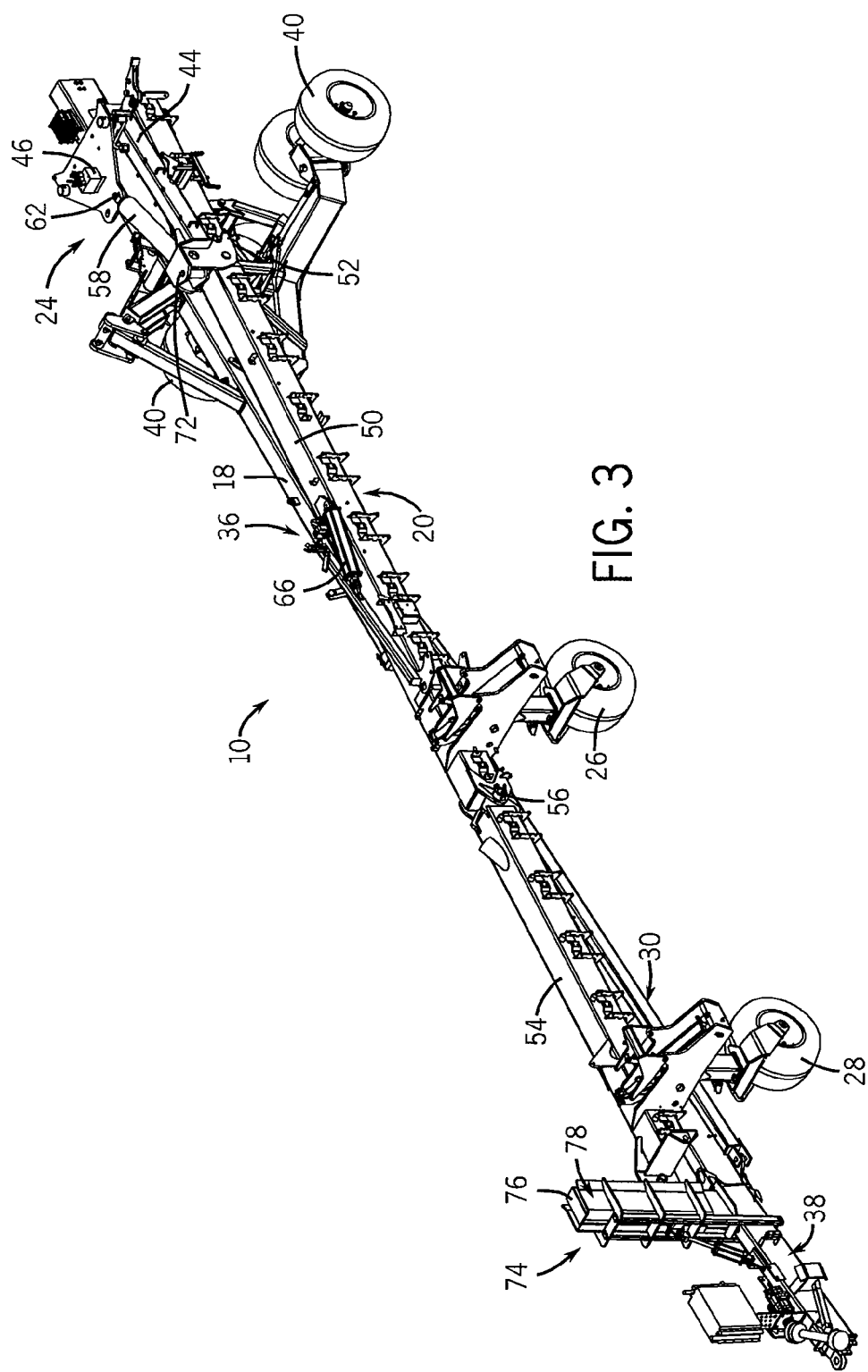
FIG. 3 is an isometric view of the portion of the planter show in FIG. 2 in a folded transport position.

FIG. 2 shows the wing boom 20 in its extended, working position. In this position, the wing boom 20 is generally perpendicular to the path of travel and the central axis of the hitch boom. The wing boom 20 is supported above the planting surface by wheels 26, 28. As will be described more fully below, the wheels 26, 28 provide support for the wing boom 20 when the boom 20 is in its extended position as well as its retracted, transport position, which is shown in FIG. 3. A draft link 30 is connected between the hitch boom 12 and the wing boom 20 at a connection point 33 forward of the mount 24. The draft link 30 provides structural support for the wing boom 20 when the wing boom 20 is in the fully extended position. As will be described more fully below, the draft link 30 includes a pair of link members 32, 34 connected to one another by a knuckle 36 that allows the link members 32, 34 to fold relative to one another when the wing boom 20 is folded forward to its transport position.

The hitch boom 18 includes a coupler 38 as known in the art for coupling the hitch boom 18 to the telescoping hitch 12. The hitch boom 18 is supported above the planting surface by a set of wheels 40, which in the illustrated embodiment includes two pairs of wheels, with a pair positioned adjacent each side of the hitch boom 18. The hitch boom 18 extends along a central axis of the planter 10 that is aligned with the hitch of the 12 of the tractor. The wheels 40 are coupled to a central wheel standard 42 that forms part of a steering/elevator assembly that is pinned to the mount 24 at a near horizontal pin 75.

Wing boom 20 has a center boom 44 that is pinned to the mount 24 at a pin 48 and an inner boom 50 that is pinned to the center boom 44 by horizontal longitudinal pin 52. The inner boom 50 is pinned to an outer boom 54 by a pin 56. Pin connection 56 allows the wheel units on the inner and outer booms 50, 54 to follow surface contours and undulations. An inner actuator 57 that in one embodiment includes a hydraulic cylinder 58 is connected to the center boom 44 and a ram 60 is pinned to the mount 24 at pin 62. In addition to inner actuator 57, a draft link actuator 64 is provided that in one embodiment includes a hydraulic cylinder 66 connected to the inner boom 50 and a ram 68 connected to outer draft link member 34.

When rams 60 and 68 are fully extended, the wing boom 20 is in the fully extended position, as illustrated in FIG. 2. However, when the rams 60 and 68 are retracted, the wing boom 20 is pulled inwardly toward the hitch boom 18 about pin 48 and eventually adjacent the hitch boom as shown in FIG. 3. More particularly, the rams 60 and 68 are retracted simultaneously until ram 68 is fully retracted. Ram 68 draws the outer link member 34 inward toward the inner boom 50 as the outer link member 34 is able to pivot relative to the inner link member 32 at knuckle 36. The ram 68 draws the outer link member 34 until the knuckle 36 abuts against the inner boom 50. With the knuckle 36 abutting the inner boom 50, the ram 60 continues to retract until the booms are adjacent and generally parallel to the hitch 12. As will be explained in greater detail below, the wheels 26, 28 rotate under the wing boom 20 when the wing boom 20 is being moved to its retracted position to provide clearance for seed units mounted to the wing boom 20. Thus, as the wing boom 20 is elevated by the wheels 26, 28 rotating under the wing boom 20, the rear end of the hitch boom 18 is elevated relative to the hitch 12 of the tractor 14. As a result, the hitch boom 18 is angled downwardly toward the hitch 12. The near vertical pin 46 is angled in such a way that as the wing boom 20 swings ahead, the angling of the wing boom 20 causes the outer end of the wing boom 20 to angle up relative to the hitch 12. So, while the telescoping hitch boom 18 angles downward, the booms are level and aligned, as illustrated in FIG. 3. This is particularly advantageous for transportation and shipping purposes.

Figure 4:
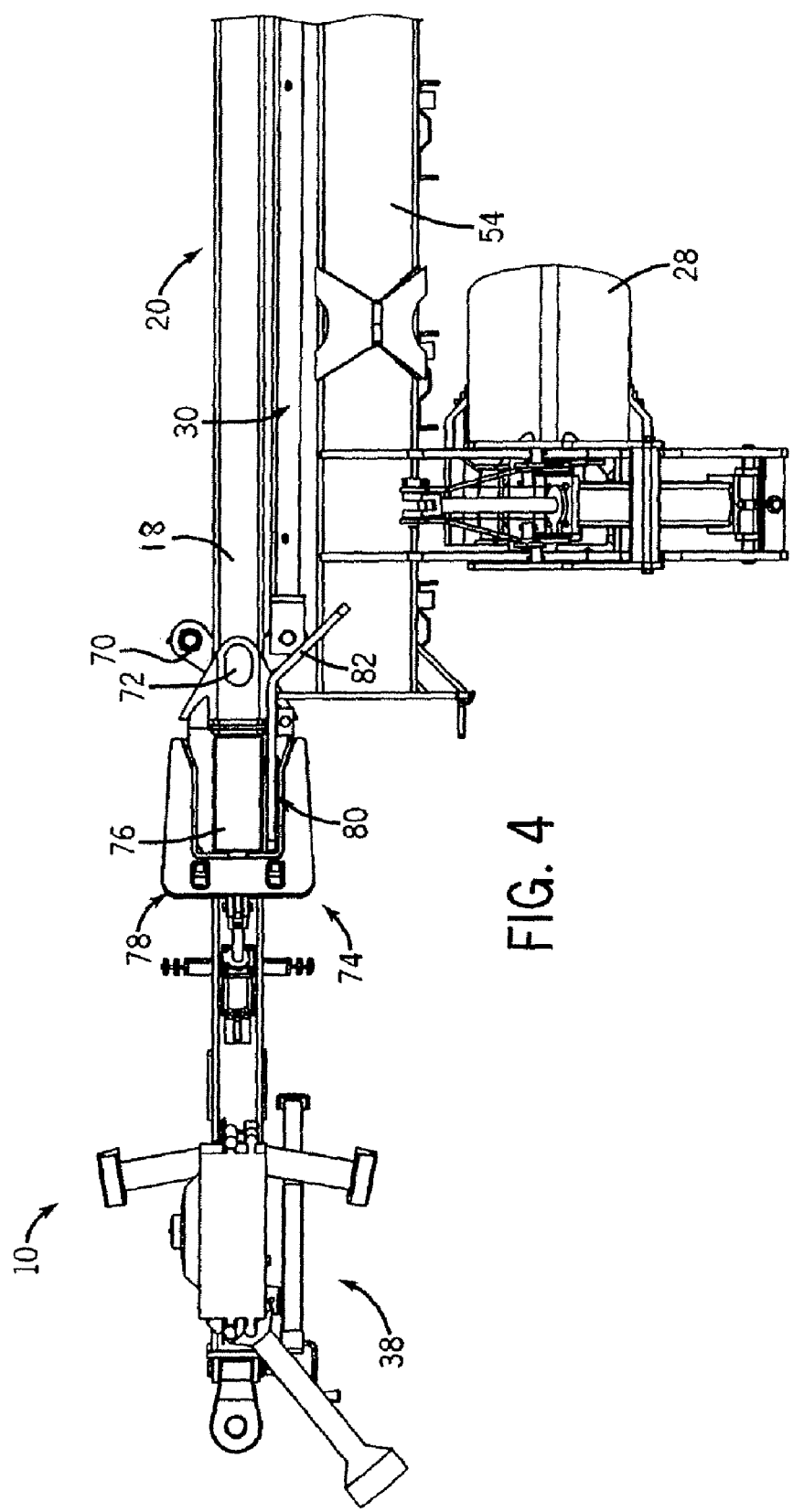
FIG. 4 an enlarged top plan view of the planter taken along line 4-4 of FIG. 3.

As shown in FIG. 4, when the planter 10 is in the transport position, the draft link 30 are pivotally connected to crank 70, which is connected to inner hitch 12 with pin 72. This provides draft connection, crank 70 can oscillate slightly as left and right boom assemblies follow terrain independtently and cause fore/aft motion of draft link 30. Terrain will also cause slight telescoping motion between inner hitch 12 and outer hitch 18.

Figure 5:
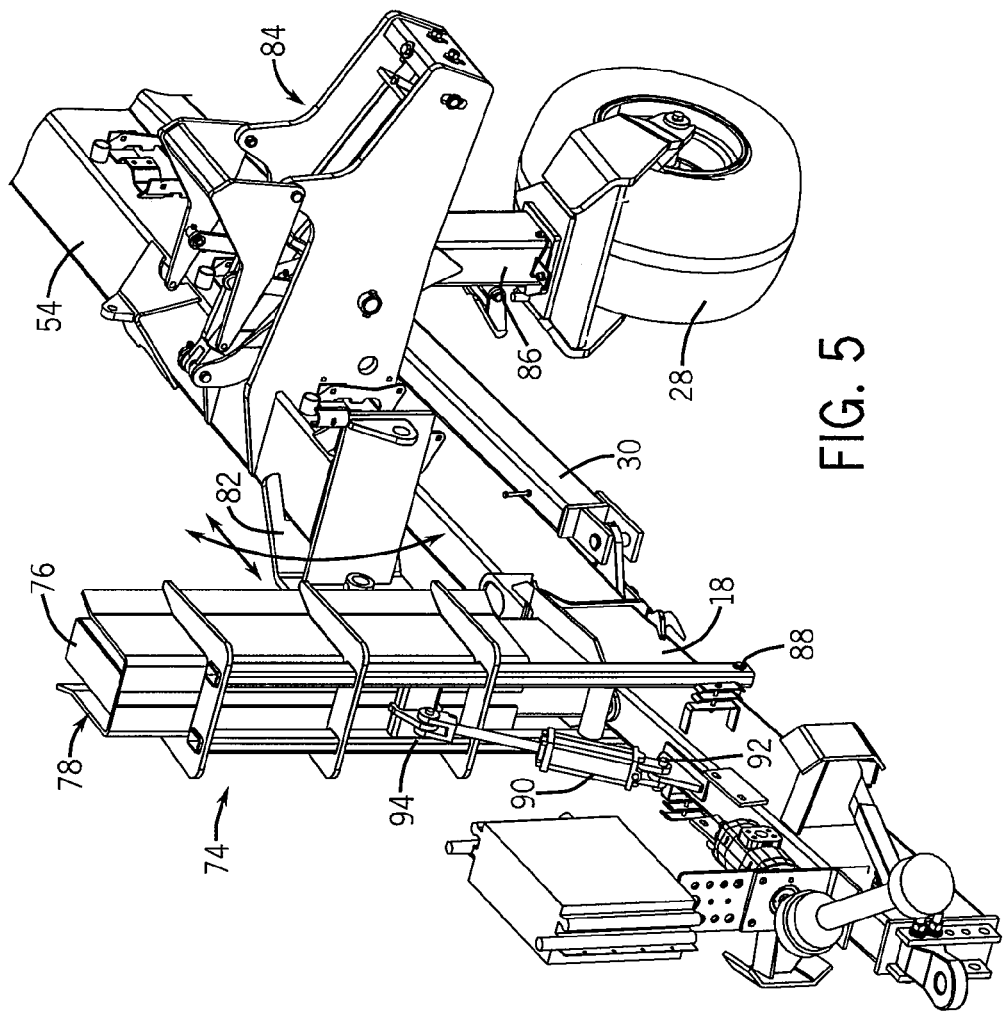
FIG. 5 is an isometric view of the planter shown in FIG. 4.
Figure 6:
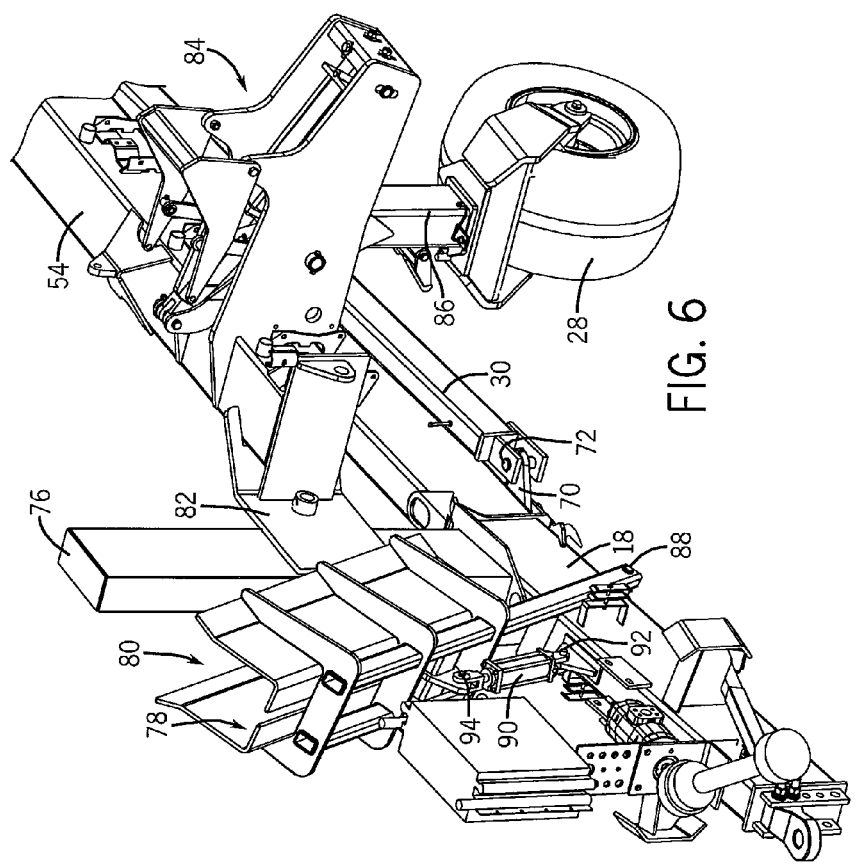
FIG. 6 is an isometric view of the planter similar to the view shown in FIG. 5 with a wing boom retainer tilted to a boom release position.

With additional reference to FIGS. 4-6, a wing boom retainer 74 is mounted to the hitch boom 18 and includes a vertical post 76 and a retainer plate 78 that defines a U-shaped channel 80 sized to receive and hold boom plate 82 mounted to the wing boom 20, and in particular, a wheel mount assembly 84 to which wheel 28 is coupled by a wheel standard 86. The retainer plate 78 is designed to retain the boom plate 82 adjacent the post 76 but allow limited vertical and lateral movement of the wing boom 20 during transport. In this regard, locking of the wing boom 20 is not solely controlled by the boom folding actuators 57 and 64.

The U-shaped retainer 78 is journalled at pin 88 to the hitch boom 18 and fore of post 76. A hydraulic actuator 90 is mounted to the hitch boom 18 with pin 92 and the retainer 78 at pin 94 such that when the actuator 90 is extended the retainer 78 is pushed forward to envelop post 76 and plate 82, as illustrated in FIGS. 4-5. When actuator 90 is retracted, the retainer 78 is pulled forward and away from the post, as illustrated in FIG. 6. Thus, when the wing boom 20 is folded forward, actuator 90 is retracted until the boom plate 82 is generally flat against the post 76. The actuator 90 is then extended to push the retainer 78 rearward to capture the post 76 and the boom plate 82.

Figure 7:
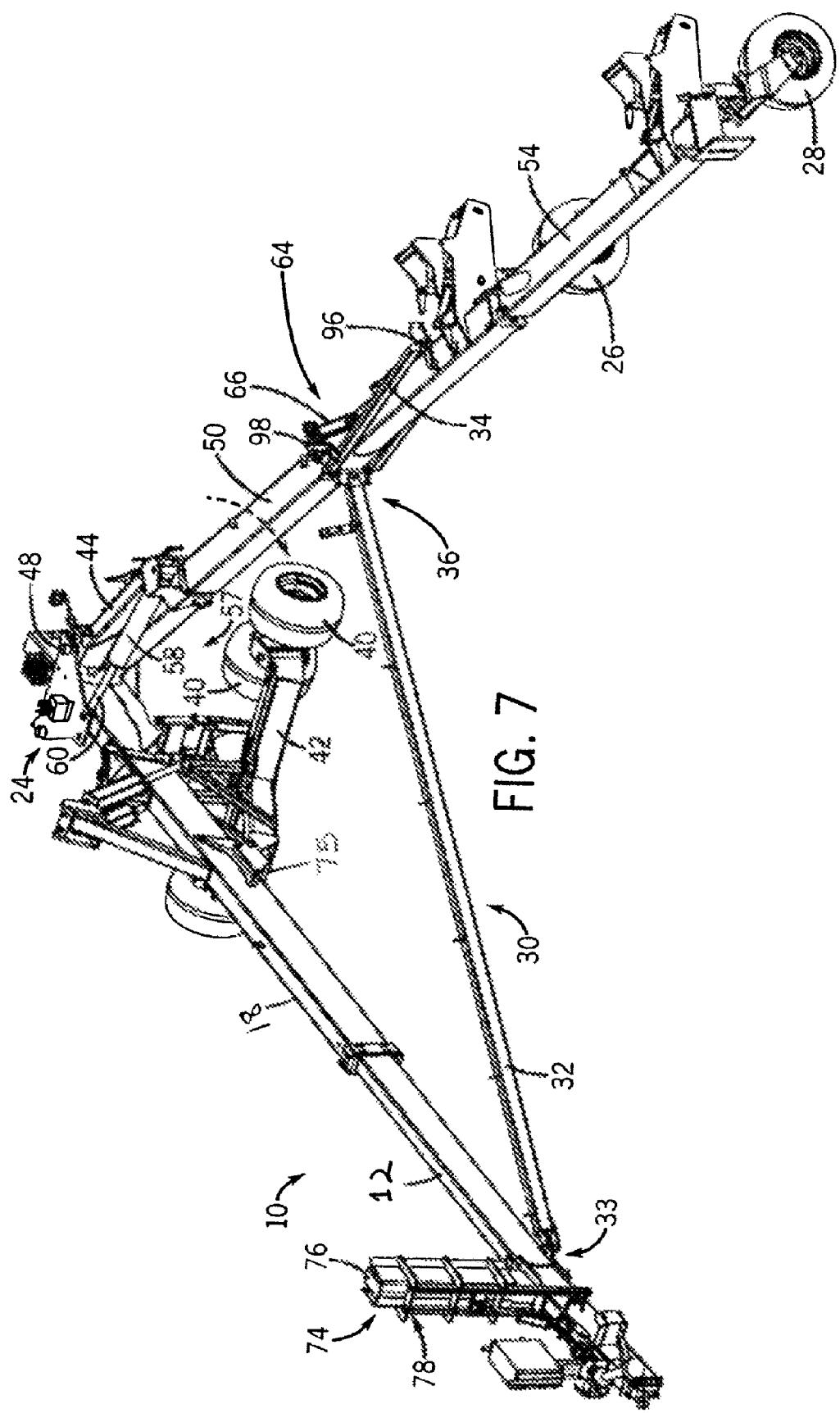
FIG. 7 is an isometric view of the planter shown in FIG. 2 with a draft link in a partially folded position.
Figure 8:
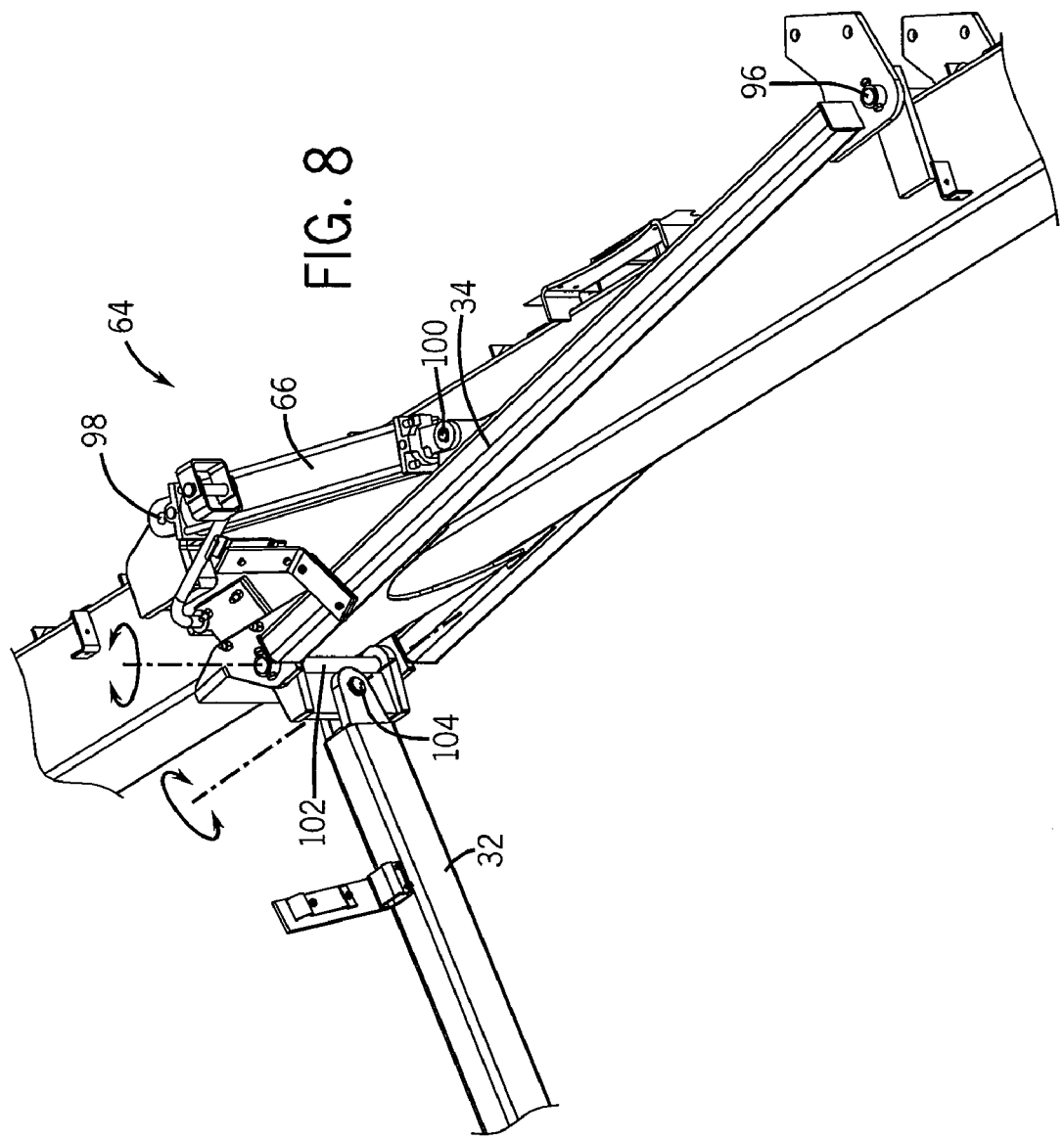
FIG. 8 is an enlarged isometric view of a portion of the draft link and wing boom shown in FIG. 7.
Figure 9:
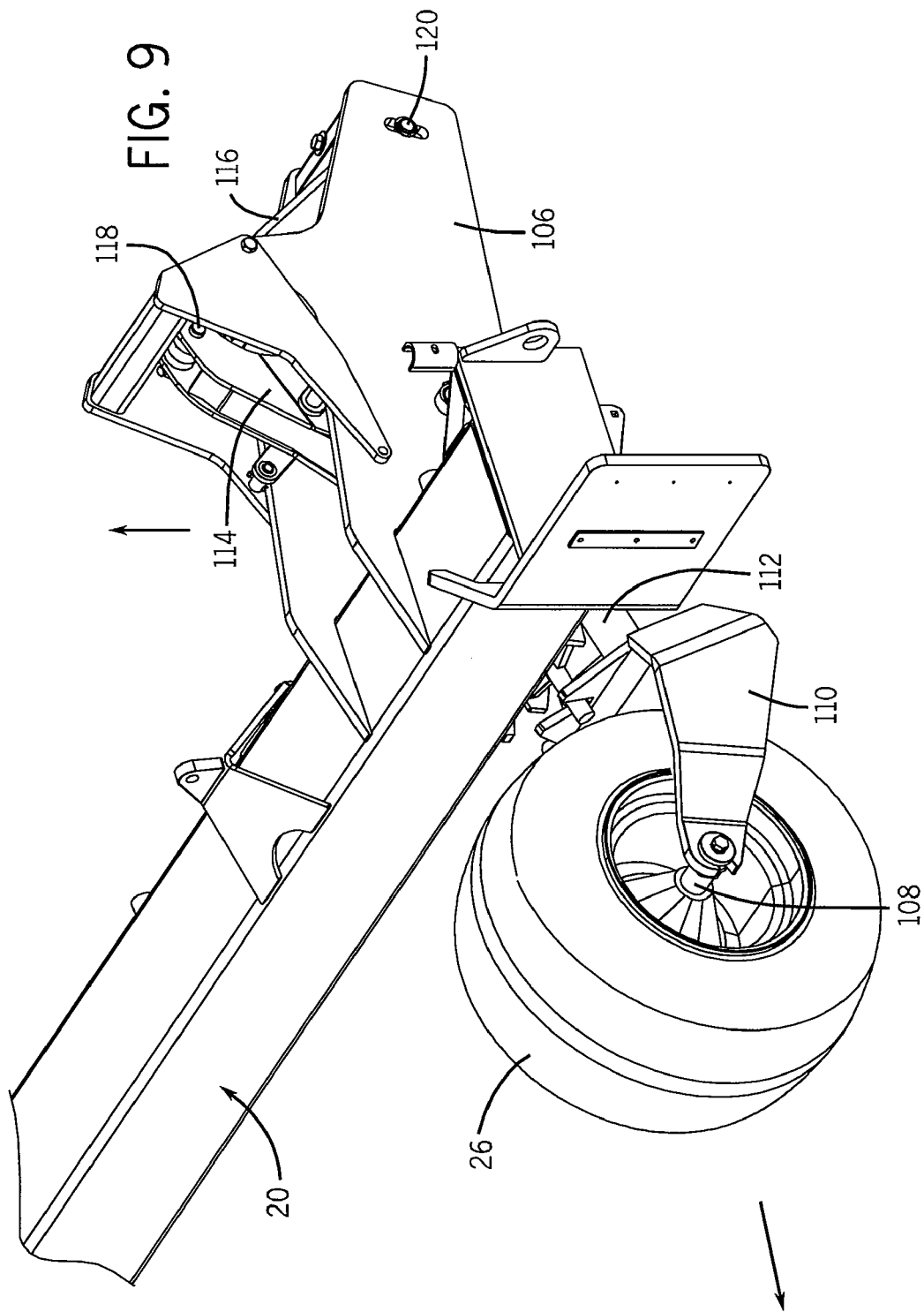
FIG. 9 is an enlarged isometric view of a wing boom wheel assembly of the planter taken along line 9-9 of FIG. 1.
Figure 10:
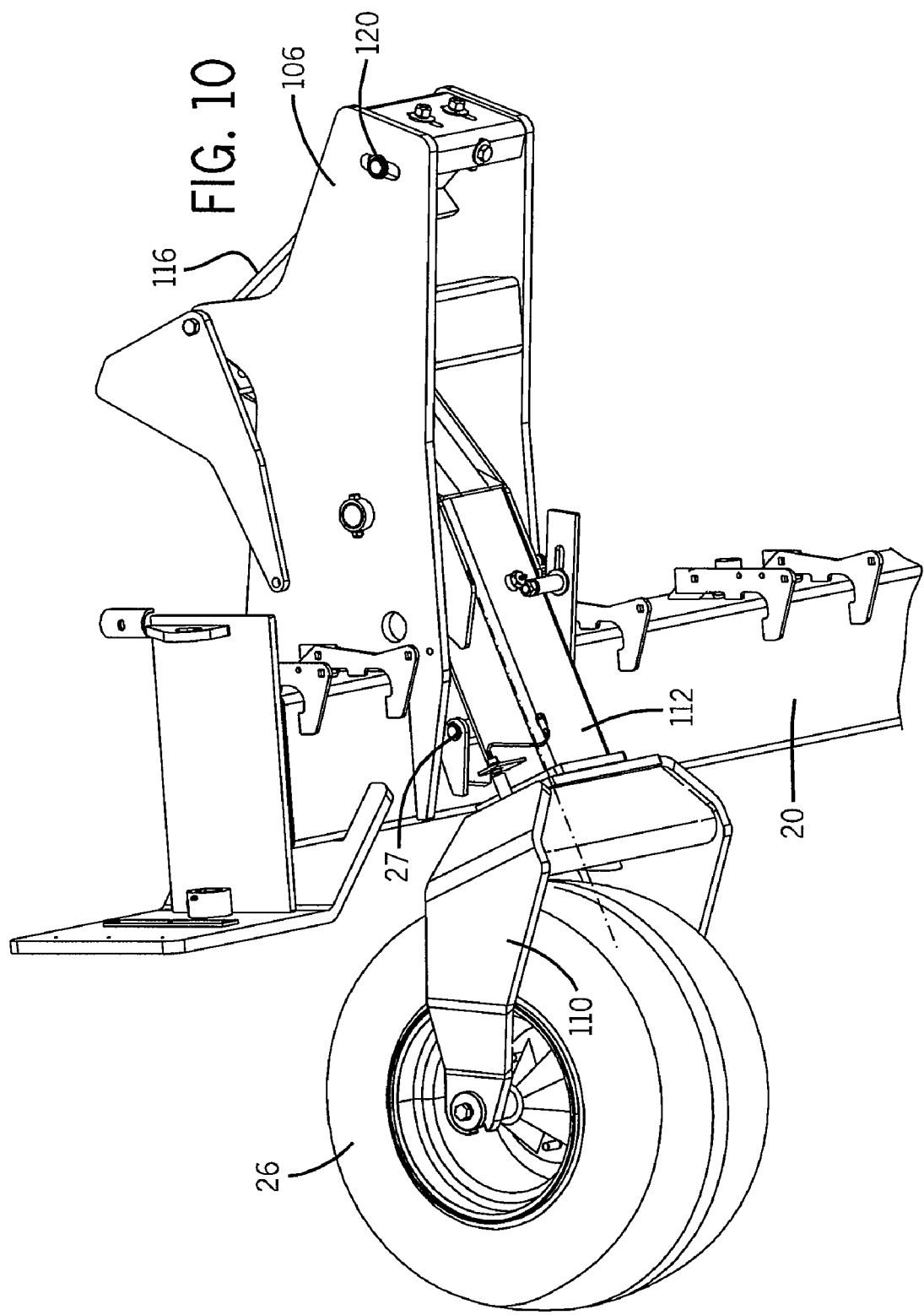
FIG. 10 is an isometric view of an underside of the wing boom assembly shown in FIG. 9.

As referenced above and with additional reference to FIGS. 7-8, a draft link 30 generally comprised of an inner link member 32 and an outer link member 34 connected between the hitch boom 18 and the wing boom 20. The inner link member 32 and the outer link member 34 are connected to one another by a knuckle 36 that allows the outer link member 34 to pivot or fold forward relative to the inner link member 32 when the actuator 64 draws the outer link member 34 toward the wing boom 20. In this regard, one end of the outer link member 34 is connected to the knuckle 36 and the opposite end of the link member 34 is pinned to the wing boom at pin 96. In a similar fashion, actuator 64 includes a cylinder 66 connected to the wing boom at pin 98 and a ram 68 linked with cylinder 66 and connected to the outer link member 34 at pin 100.

Thus, when the wing boom 20 is in the working position, shown in FIG. 2, actuators 57 and 64 are in the fully extended position. When the wing boom is to be placed into the transport position, both actuators are retracted thereby causing the outer link member 34 to pivot forward and the wing boom 20 to pivot forward. The actuator 64 will retract until the knuckle 36 is against the wing boom 20, as shown in FIG. 8. Thereafter, the actuator 57 will continue to retract causing further folding of the wing boom 20 and the outer link member 34 until the transport position, shown in FIG. 3, is reached.

One skilled in the art will therefore appreciate that the knuckle 36 provides two axis of rotation. More particularly, the outer link member 34 is journalled to the knuckle 36 via a vertically oriented pin 102 and the inner link member 32 is journalled to the knuckle 36 via a generally horizontal pin 104. In addition, the relative lengths of the inner link member 32 and the outer link member 34 dictate the amount of telescoping of hitch 12. Thus, the lengths of the members 32, 34 can be tailored on a per application basis to accommodate the desired location of support on the wing boom 20 yet also accommodate the amount of extension of the hitch 12 needed to clear the tractor 14 when the wing boom is in the transport position.

Referring now to FIGS. 9-13, the wheels 26, 28 are designed to caster as the wing boom 20 is moved from the working position to the transport position. This castering allows the wing boom to "walk" forward as it is being fold to the transport position. While FIGS. 9-13 only show wheel 26 it is understood that wheel 28 is similar constructed.

Wheel 26 is connected to the wing boom 20 by a wheel mount 106, which is connected to the wing boom in a known manner. The wheel 20 is centered about an axle 108 that is pinned to a caster frame 110. The caster frame 110 is connected to a wheel standard 112 that is connected to the wheel mount 106 via arm 114. The arm 114 may be pivoted by an actuator 116 that is pinned to the arm 114 at pin 118 is pinned to the wheel mount 106 at pin 120. In a preferred embodiment, the actuator 116 is a hydraulic cylinder and ram combination similar to the hydraulic actuators described above. When the wing boom is in the field position, the wheel 26 is locked so as to travel along a fixed line parallel to the path of travel of the hitch boom. However, when the wheel 26 is unlocked, the wheel 26 may caster thereby providing support for the wing boom 20 as the wing boom 20 is folded forward. In this regard, the wheel 26 maintains support of the wing boom 20 when the wing boom 20 is in the working and transport positions.

Figure 11:
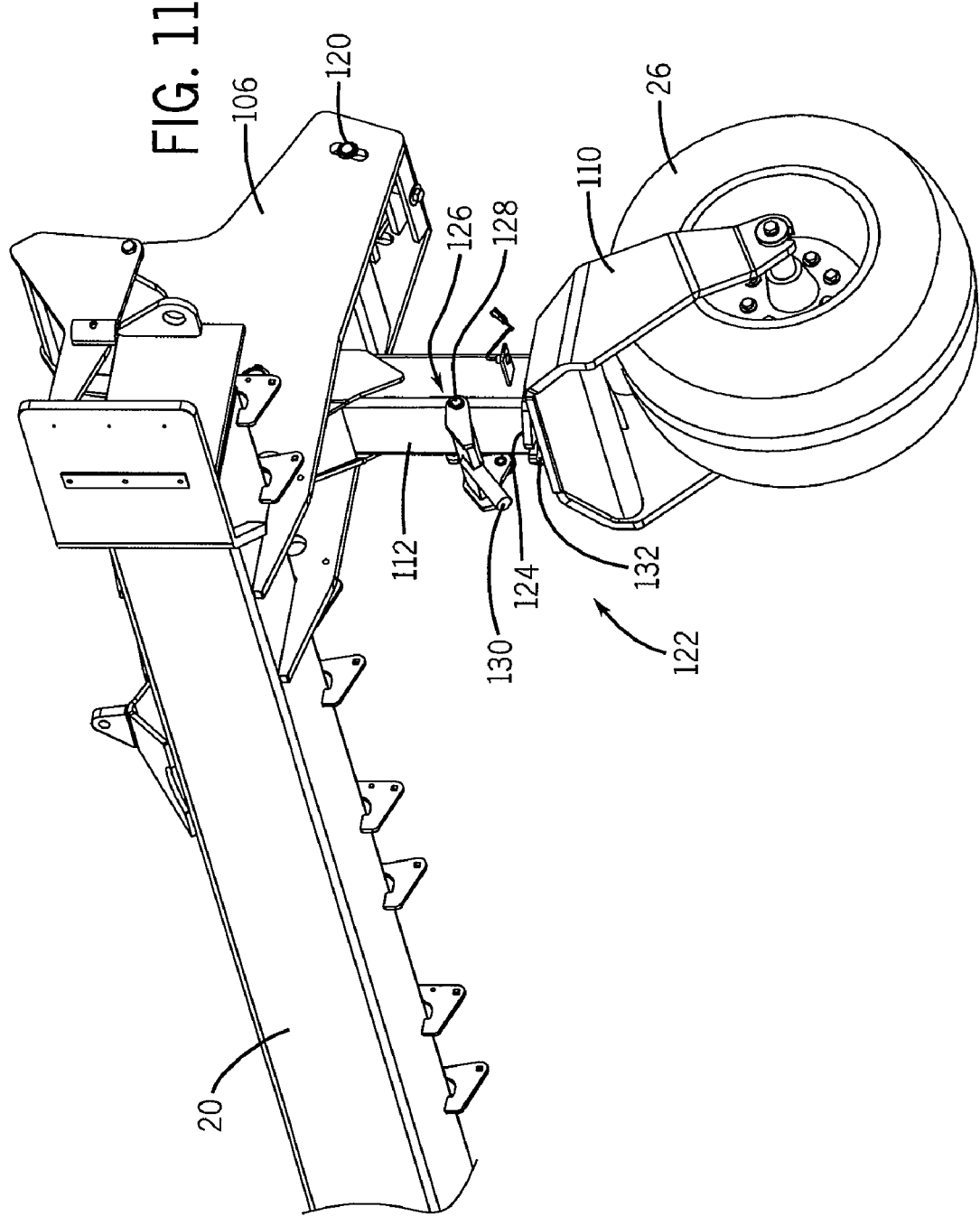
FIG. 11 is an isometric view of an underside of the wing boom assembly in a transport position.

The wheel 26 is locked by a wheel lock assembly 122 that generally includes a locking plate 124 mounted atop the caster frame 110 and a lock 126 connected to the wheel standard 112, as best shown in FIG. 11. The lock 126 is connected to the wheel standard 112 by a pair of pins 128 and includes a post 130 sized to be received by locking plate 122. More particularly, the locking plate 124 has a U-shaped notch 132 that receives the post 130 when the lock is pivoted downward. When the post 130 is seated in the notch 132, the caster plate 124 and thus the caster frame 110, connected thereto, cannot rotate about standard 112 and therefore locks the wheel 26 into a non-caster position.

Figure 12:
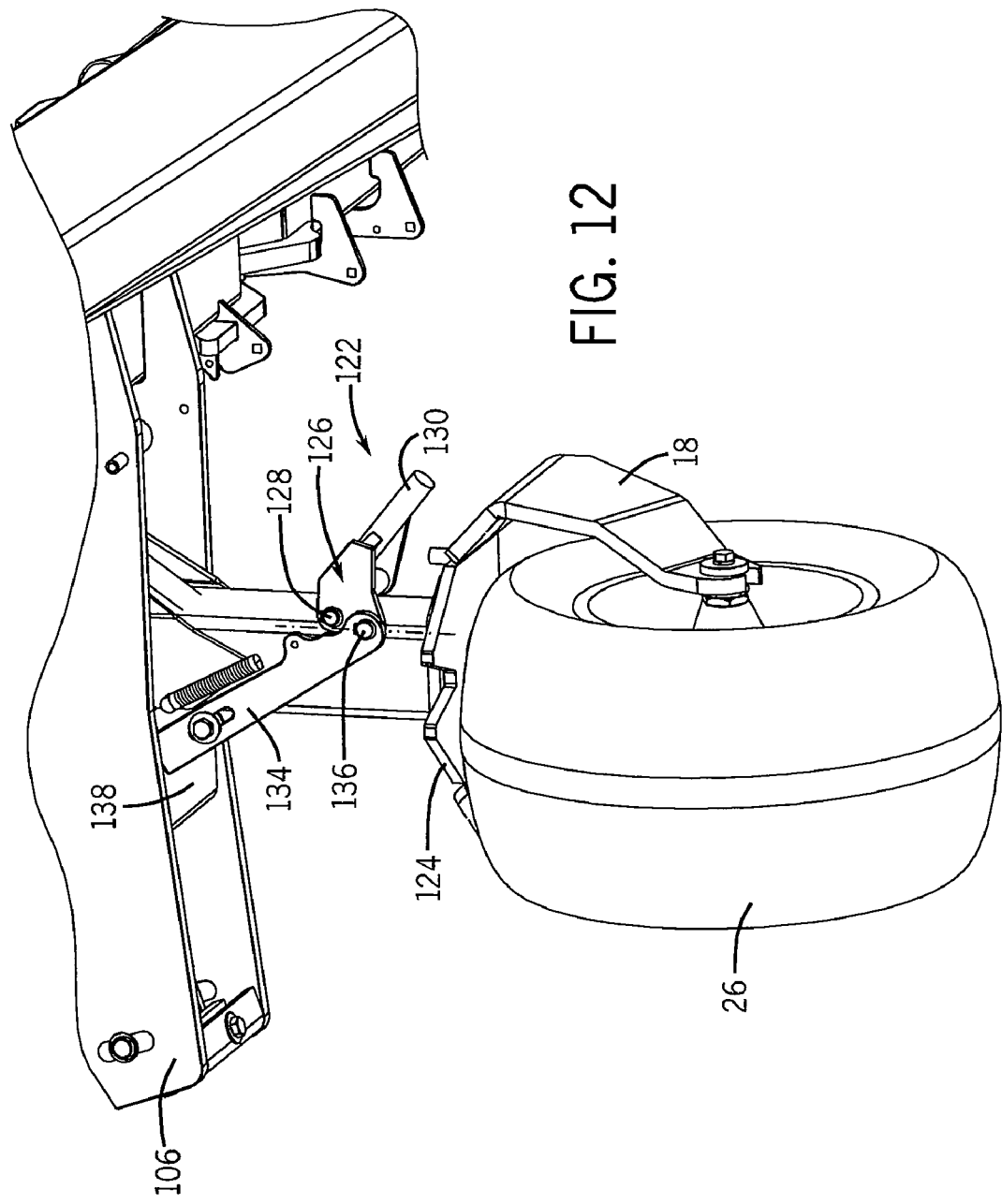
FIG. 12 is a front elevation view of the wing boom assembly in the transport position.
Figure 13:
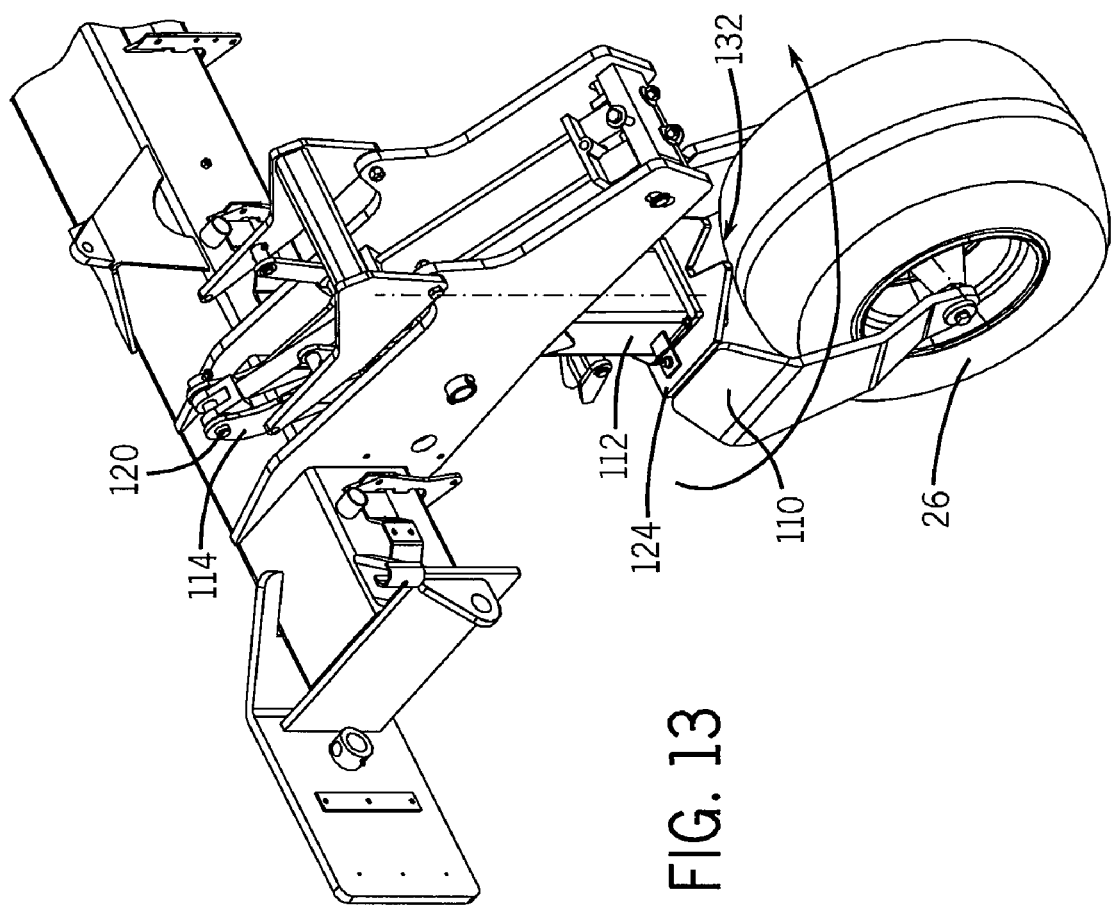
FIG. 13 is a top isometric view of the wing boom assembly in the transport position.

As best shown in FIG. 12, an unlocker bar 134 is pinned to the lock 126 at pin 136. When the hydraulic actuator 116 is activated and the arm 114 pivoted upward, the wheel standard 112 is pulled toward the rear of the wing boom 20 effectively causing the wheel standard 112 to be placed in a vertical position, such as shown in FIGS. 11-13. In addition, as the wheel standard 112 moves to the vertical or upright position, the unlocker bar 134 encounters a stop bar 138 mounted to the underside of the wheel mount 106. This forces the unlocker bar 134 to load pin 136. The downward force causes the lock 126 to pivot upward about pin 128 thereby releasing the post 130 from notch 132 of the caster plate 124. The actuator 116 holds the wheel standard 112 in the upright position and the wheel 26 is free to caster as the wing boom 20 is moved to the transport position. When the wing boom 20 is in the transport position, the castering of the wheel 26 allows the wheel 26 to travel parallel to the path of travel of the hitch boom 18 but effectively rotated ninety degrees from its position when the wing boom 20 is in the working position.

When the wing boom 20 is moved from the transport position to the working position, the wheel 26 will similarly caster. Once the wing boom 20 is in the working position, the actuator 116 can lower the wheel 26 to its working position thereby releasing the load on pin 136. As a result, the lock 26 will pivot downward and the post 130 will be received in the notch 132 to lock the wheel into the working position.

Many changes and modifications could be made to the invention without departing from the spirit thereof. The scope of these changes will become apparent from the appended claims.

I claim:

1. A wing boom for an agricultural planting assembly, comprising:
   an elongated boom assembly configured to support a plurality of spaced planting units, the boom assembly having at least one section pivotally coupled to an adjacent inner boom and an outer end;
   a wheel mount connected adjacent to the outer end of the boom assembly;
   a wheel configured to support the outer end of the boom assembly;
   a caster frame configured to rotatably carry the wheel;
   a wheel standard having a first end coupled to the wheel mount on a pivotal axis parallel to the boom and the caster frame pivotably coupled to a second end, the wheel standard movable between a vertical position which is substantially perpendicular to the boom assembly when the agricultural planting assembly is in a transport position and an acute angle relative to the boom assembly when the agricultural planting assembly is in a planting position and the boom assembly is substantially perpendicular to a direction of travel;
   an actuator coupled to a portion of the wheel mount and operably connected to the wheel standard, the actuator configured to move the wheel standard between the vertical position when in the transport position and the acute angle relative to the boom assembly when in the planting position; and
   a caster lock connected to the wheel standard and operably connected to the actuator, the caster lock configured to cooperate with a portion of the caster frame to lock the caster frame in a fixed position when the actuator moves the wheel standard into the acute angle relative to the boom assembly when the boom assembly is moved into the planting position so that the wheel is positioned to move only in the direction of travel, the caster lock configured to cooperate with the caster frame to unlock the caster frame when the actuator moves the wheel standard into the vertical position and the boom assembly is moving and moved into the transport position to permit the caster frame to freely pivotably move, so that the wheel positions itself to assist in moving the boom assembly into the transport position and the wheel supports the weight of the boom assembly in the planting position, in the transport position, and in a transition therebetween.

2. The wing boom of claim 1 wherein the caster frame includes a notch and the caster lock includes a post adapted to be received by the notch to lock the wheel.

3. The wing boom of claim 1 wherein the first end of the wheel standard is pivotably coupled to the wheel mount.

4. The wing boom of claim 3 wherein the actuator comprises a hydraulic cylinder mounted to the wheel mount and configured to pivot the wheel standard relative to the wheel mount.

5. An agricultural planter comprising:
   an implement frame movable between a working position and a transport position, the implement frame configured to support a plurality of seed units;
   a wheel mount mounted to a portion of the implement frame;
   a wheel configured to support at least a portion of the implement frame;
   a caster frame configured to rotatably carry the wheel;
   a wheel standard having a first end pivotably coupled to the implement frame on a pivotal axis parallel to the implement frame and the caster frame pivotably coupled to a second end, the wheel standard movable between a vertical position which is substantially perpendicular to the implement frame when the agricultural planter is in a transport position and an acute angle relative to the implement frame when the agricultural planter is in the working position and the implement frame is substantially perpendicular to a direction of travel;
   an actuator coupled to a portion of the wheel mount and operably connected to the wheel standard, the actuator configured to move the wheel standard between the vertical position when in the transport position and the acute angle relative to the implement frame when in the working position; and
   a caster lock movably connected to the wheel standard and operably connected to the actuator, the caster lock configured to cooperate with a portion of the caster frame to lock the caster frame in a fixed position when the actuator moves the wheel standard into the acute angle relative to the implement frame when the implement frame is moved into the working position so that the wheel is positioned to move only in the direction of travel, the caster lock configured to cooperate with the caster frame to unlock the caster frame when the actuator moves the wheel standard into the vertical position and the implement frame is moving and moved into the transport position to permit the caster frame to freely pivotably move, so that the wheel positions itself to assist in moving the implement frame into the transport position and the wheel supports the weight of the implement frame in the working position, in the transport position, and in a transition therebetween.

6. The planter of claim 5 wherein the caster frame includes a notch and the caster lock includes a post configured to engage the notch when the implement frame is in the working position.

7. The planter of claim 6 wherein an unlocking member connected to the wheel mount having a spring attached thereto engages a load pin to move the post between a locked position in the notch and an unlocked position out of the notch.

8. The planter of claim 7 wherein the caster lock includes an unlocking member connected to the wheel mount and configured to impart a disengaging bias on the load pin when the wheel standard is pivoted relative to a wheel mount when the implement frame is moved from the working position to the transport position.

9. The planter of claim 8 wherein the unlocking member connected to the wheel mount is configured to impart an engaging bias on the load pin when the wheel standard is pivoted relative to a wheel mount when the implement frame is moved from the transport position to the working position.

* * * * *